2 Sheets--Sheet 1.
S. G. & A. BARKER.
Nut-Lock.
No. 168,958. Patented Oct. 19, 1875.
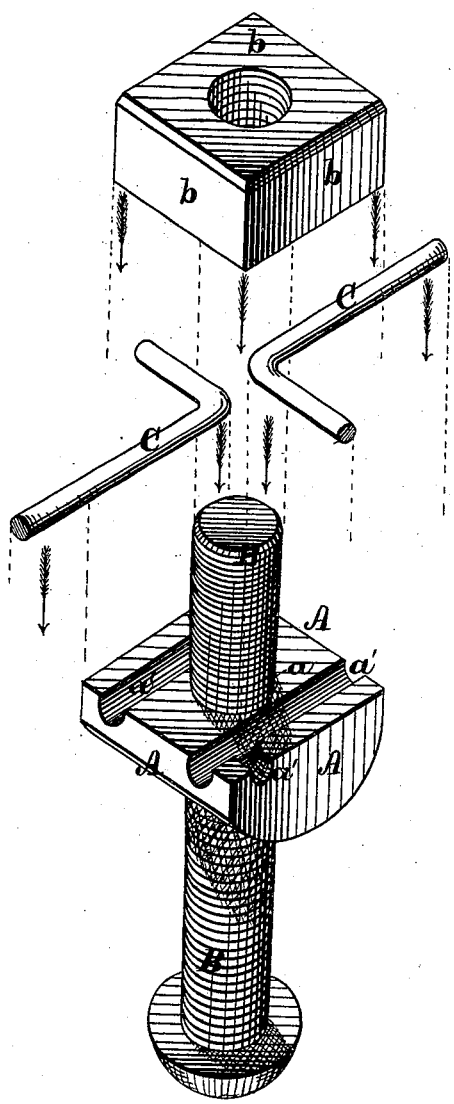
Witnesses:
Jas. E. Hutchinson
John R. Young
Inventors:
S. G. and A. Barker, by
Prindle and Co., their Attys

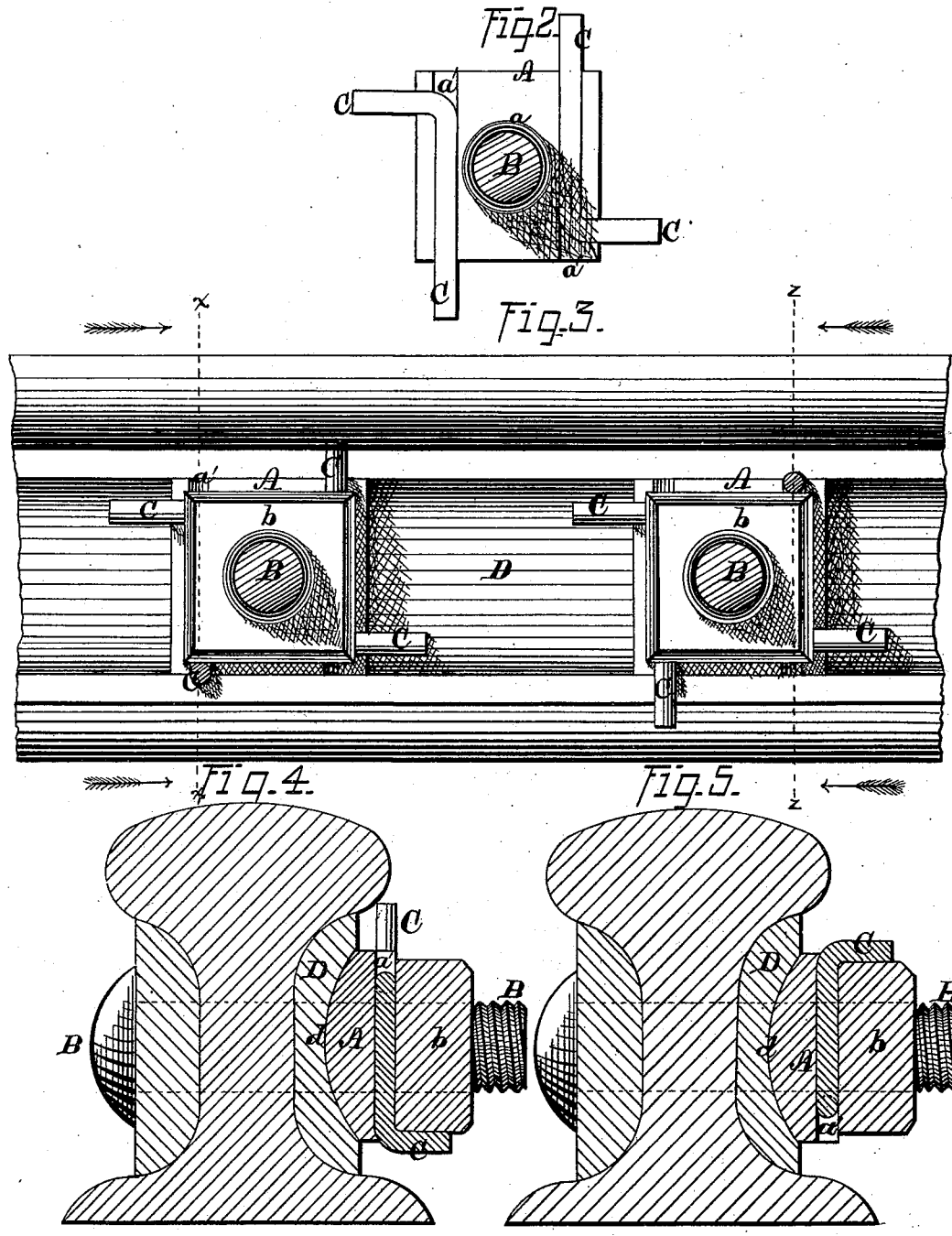

UNITED STATES PATENT OFFICE.

SAMUEL G. BARKER, OF SCRANTON, AND ABEL BARKER, OF WYOMING, PA.; SAID SAMUEL G. BARKER ASSIGNOR TO SAID ABEL BARKER.

IMPROVEMENT IN LOCK-NUTS.

Specification forming part of Letters Patent No. 168,958, dated October 19, 1875; application filed April 4, 1873.

*To all whom it may concern:*

Be it known that we, SAMUEL G. BARKER, of Scranton, and ABEL BARKER, of Wyoming, both in Luzerne county, State of Pennsylvania, have invented certain new and useful Improvements in Lock-Nuts; and do hereby declare that the following is a full, clear, and exact description thereof, reference being had to the accompanying drawings, making a part of this specification, in which—

Figure 1 is a perspective view of our improved washer, key, and bolt, separated from each other. Fig. 2 is a plan view of the outer side of said washer and keys, as combined. Fig. 3 is a side elevation of a rail-joint, showing the fish-plates secured together by means of bolts, which have their nuts locked in position by our improved devices; and Figs. 4 and 5 are cross-sections, upon lines $x\ x$ and $z\ z$, respectively, of Fig. 3.

Letters of like name and kind refer to like parts in each of the figures.

The design of our invention is to enable nuts to be securely locked in position upon bolts with ease, and without especial preparation of either nut or bolt; and to this end it consists in combining with a bolt and nut a washer, provided within its outer face with intersecting grooves, and a key, having such transverse size and shape as to enable it to be wholly contained within said grooves, and having longitudinally the form of a right angle, so that when placed in position within said washer the ends of said key shall project from adjacent sides of the same, substantially as and for the purpose hereinafter specified.

In the annexed drawings, A represents a washer, which, preferably, has a square form in plan view, and is provided with a central opening, $a$, for the reception of a bolt, B. Within the outer face of the washer A, between the opening $a$ and each edge, is formed a groove, $a'$, which has a depth equal to its width, so as to enable a round rod or wire, C, having corresponding dimensions, to be wholly contained within the same.

As seen in Fig. 2, the grooves $a'$ and $a'$ intersect each other at right angles, and the wire or key C is correspondingly shaped lengthwise so as to enable it to be placed in two grooves, and cause its ends to extend outward from said washer in lines having relative angles of ninety degrees. The washer thus constructed is placed around a bolt, B, and prevented from turning by any suitable means, the key C is placed in position, and the nut $b$ screwed downward to place, after which said nut is adjusted until its sides coincide with those of said washer, and one end of said key is then bent outward so as to bear against one of the sides of said nut in rear of its center, in which position said key end operates as a lock, and prevents said nut from being turned outward by the jar or motion of the mechanism to which it is attached.

When necessary to remove the nut $b$ the end of the key is to be bent back to its normal position, and after the replacing of said nut, may be again bent outward so as to lock the latter in place once more, said key end being usually capable of from three to four such changes, so that as it is required to use but one end of a key at a time it will be seen that each key will, under ordinary circumstances, outlast an iron or even a steel rail for railroads.

For use upon the joints of railroad-rails the washer A is, preferably, made convex vertically upon its rear side, and a corresponding half-round groove, $d$, is formed within the outer face of the fish-plate D, by which means said washer is prevented from turning.

Having thus fully set forth the nature and merits of our invention, what we claim as new is—

In combination with a bolt, B, and nut, $b$, the washer A, provided within its outer face with the right-angled grooves $a'$ and $a'$, and the key C, having a right-angled form longitudinally, and arranged to fit into said grooves, substantially as and for the purpose specified.

In testimony whereof we have hereunto set our hands the 2d day of April, 1873.

SAMUEL G. BARKER.
   ABEL BARKER.

Witnesses:
  EDWARD A. O'MALLEY,
  FRED. FULLER.